J. RODERMOND & P. CORRIGAN.
WASTE-WATER TRAP.
No. 174,857. Patented March 14, 1876.
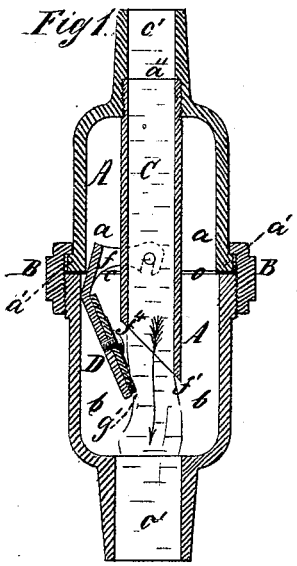
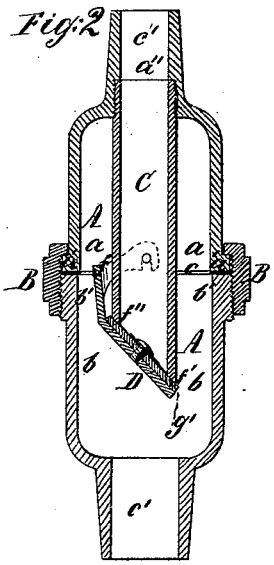
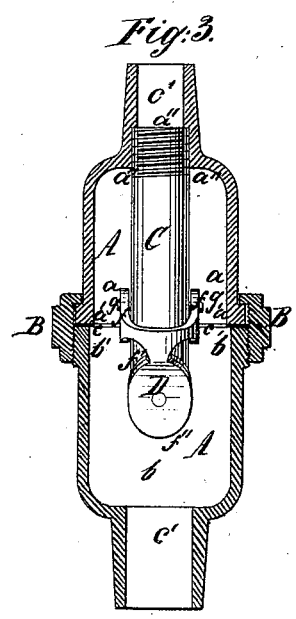
Witnesses:
Ernst Bilhuber
H. Wells Jr.
Inventors:
Jacob Rodermand,
Philip Corrigan
per James A. Whitney
Atty.

UNITED STATES PATENT OFFICE.

JACOB RODERMOND, OF NEW YORK, N. Y., AND PHILIP CORRIGAN, OF BAYONNE, NEW JERSEY.

IMPROVEMENT IN WASTE-WATER TRAPS.

Specification forming part of Letters Patent No. 174,857, dated March 14, 1876; application filed December 13, 1875.

*To all whom it may concern:*

Be it known that we, JACOB RODERMOND, of the city, county, and State of New York, and PHILIP CORRIGAN, of Bayonne, in the county of Hudson and State of New Jersey, have invented an Improvement in Waste-Water Traps, of which the following is a specification:

The object of this invention is to provide a substitute for the bent trap or water-seal in ordinary use in water-closets, and for other like purposes, which substitute, in a far more efficient degree shall prevent the efflux or regurgitation of foul odors, noisome gases, &c., through or from the waste-pipe or passage in which the trap is placed.

The invention comprises, in a waste-water trap, a valve, constructed with lateral lugs projecting upward and inward to the sides of the water-outlet pipe and pivoted to the latter, the construction and arrangement of the whole being such as to cause the valve to swing shut by its own gravity, thereby dispensing with all counterpoises, weights, springs, &c., to insure the requisite closing-action of the valve.

Figure 1 is a central longitudinal sectional view of a trap made according to our invention, showing the poition of the parts during the downward flow of liquid through the trap. Fig. 2 is a similar view, showing the position of the parts when the trap is closed to prevent the reflow, passage, or regurgitation of noisome and fetid gases therethrough. Fig. 3 is a sectional view in a plane at right angles with Figs. 1 and 2.

A is a shell or chamber, which, for cheapness and convenience in manufacture, is made in two sections, $a$ $b$, the section $a$ having a flange, $a$, upon which is borne the collar B, the latter provided with an internal screw-thread, into which is screwed the externally-threaded portion $b'$ of the section $b$. By this means the two sections are firmly secured together, a packing, $c$, of leather or other suitable material being preferably placed between them. The outer end of each section is elongated and narrowed to form a neck, $c'$, whereby, by any of the methods commonly known to plumbers, the usual waste-pipe may be attached to the shell A, the latter being, of course, in line and continuous with the said pipe. When the trap is arranged for use the section $a$ is uppermost, and this section $a$ has in its throat $a''$ an internal screw thread or nut which permits the fixed attachment of the valve-tube C, which thus depends from the top of the shell, as fully shown in Figs. 1, 2, and 3. The lower end of this tube is cut sloping, as shown from $f'$ to $f''$. Arranged to fit upon this sloping lower end of the valve-tube C is a valve, D, suspended by arms $f$ from studs or bearings $g$ projecting from opposite sides of the tube, as shown more clearly in Fig. 3. The studs or bearings $g$ are not in the axial plane of the tube, but so far aside therefrom that the weight of the valve D and its arms $f$ will automatically press the valve upward against the sloping end of the aforesaid tube to close the same. The valve is preferably faced or packed with leather or like material, as indicated at $g'$, in order that the face of the valve, being continually moist from the ordinary passage of liquids, may fit snugly and closely to the end of the pipe, when pressed to or against the same by its own weight, as just set forth.

The trap, as thus constructed, being duly placed in the waste or outlet pipe of a water-closet, as hereinbefore indicated, or in a waste or water pipe for other purposes, the down-flow of liquids from the trunk of the closet, or from other source, as the case may be, will, by the pressure of the liquid, depress or open the valve just far enough, and no farther, to permit the escape or passage of the liquid; but as soon as the pressure of the liquid ceases, the valve, by its own weight, will close the tube C, and thus prevent the upward passage of any gases, odors, or exhalations through the tube C, an effectual barrier being thus interposed to the escape of such noxious and deleterious emanations to the room or apartment in which the water-closet, sink, or other apparatus with which the trap is connected, may be situated; and it will be particularly observed that the valve D, being closed firmly and snugly against the end of the tube C, will resist a pressure of air, as from back-pressure in the sewers, that with the usual bent trap or water-closet seal would be forced back or regurgitate through the water opposed to its passage, and thus contaminate the room or apartment in which the water-closet is provided for use, our aforesaid invention, therefore, being adapted for successful use where the ordinary trap would be practically inoperative, not only for water-closets, but for other purposes where the upward passage of gases is to be prevented, as set forth.

What we claim as our invention is—

In a waste-water trap, the valve D, constructed with the lateral suspending-lugs $f$ pivoted to the sides of the outflow pipe or passage, the whole constructed and disposed substantially as herein described, whereby the valve is caused to close automatically by its own gravity, without the use of counterpoise, weights, or springs, as set forth.

JACOB RODERMOND.
PHILIP CORRIGAN.

Witnesses:
JAMES A. WHITNEY,
H. WELLS, JR.